United States Patent [19]

Gosling et al.

[11] 4,065,706
[45] Dec. 27, 1977

[54] BRUSHLESS D.C. MOTOR

[75] Inventors: Alexander Benett Gosling; Barrie Ewart Mealing, both of Cambridge, England

[73] Assignee: Danfoss A/S, Nordborg, Denmark

[21] Appl. No.: 702,493

[22] Filed: July 6, 1976

[30] Foreign Application Priority Data

June 18, 1975  Germany .............................. 2527041

[51] Int. Cl.[2] ............................................ H02K 29/00
[52] U.S. Cl. ..................................... 318/254; 318/138
[58] Field of Search ............... 318/138, 254, 132, 696; 310/191, 193, 68 C

[56] References Cited

U.S. PATENT DOCUMENTS 3,766,456   6/1970   Carow .................................. 318/138
3,961,211   6/1976   Vergues ............................. 310/68 C

*Primary Examiner*—Herman J. Hohauser

[57] ABSTRACT

The invention relates to a brushless self-starting D.C. motor assembly of the type having a rotor with a permanent magnet providing a rotor field, a stator, and one or more stator windings. A D.C. source is provided along with electrically controllable power transistor switch means between said source and each of the windings. A position sensing coil element is mounted adjacent the rotor and has a core which is saturatable by the rotor field at a predetermined position of the rotor to provide a control signal. A control unit is disposed between the means and each of the switches for receiving the control signal and actuating each of the switches in turn in response thereto. The core is preferably ferrite and preferably a permanent magnet.

6 Claims, 7 Drawing Figures

BRUSHLESS D.C. MOTOR

The invention relates to a brushless self-starting D.C. motor, particularly for a hermetically encapsulated refrigerator, comprising a rotor having a permanent magnet, a stator winding of which the flow is controllable in response to the rotary position of the rotor by means of a controllable electronic servo-element in series with the stator winding at the D.C. source, and a magnetic field-dependent component which is subjected to the rotor field to determine the rotary position and of which the field-dependent change in parameter is convertible into control signals for the servo-element.

A D.C. motor of this kind is known, in which a Hall generator is used as the magnetic field-dependent component in order to make starting independent of the rotary speed, in contrast with a sensing coil in which no voltage would be induced when the rotor is stationary. By reason of its multitude of terminals, a Hall generator involves additional wiring expense. It requires a constant flow of current, the Hall current, which decreases the efficiency of the motor. Further, a Hall generator is dependent on temperature, which can result in displacement of the switching point of the servo-element, a power transistor operated as a switch, and thus again to a reduction in the motor efficiency. The efficiency of the D.C. motor and its cost play a particularly decisive role when using the motor for refrigerators which are made in large numbers and, in relation to their useful life, are frequently in operation, particularly in the case of accumulator-driven refrigerators for leisure use, e.g. in caravans, boats, holiday cottages etc., but also in the case of battery-operated household appliances such as tape machines.

Brushless D.C. motors with more than two stator windings are also known, in which the magnetic A.C. field of the oscillating coil of a constantly oscillating LC oscillator alternately induce a control voltage in control coils which are disposed in the control circuit of a stator winding and are distributed over the periphery of the stator, so that a metallic segment rotating with the rotor consecutively couples the magnetic field of the oscillating coil to all the control coils or shields it from all the control coils except one. This involves a still higher expense with regard to wiring of the control coils and their accommodation on the stator as well as the construction of the coupling or screening means.

The invention is based on the object of providing a brushless D.C. motor of the aforementioned kind which has a high efficiency and simple construction.

According to the invention, this object is achieved in that the magnetic field-dependent component is a sensing coil having a core which is saturable by the rotor field.

This sensing coil very sensitively responds to the magnitude of the rotor field by a change in its inductance and quality, irrespective of the rotary speed of the rotor. The change can be very simply utilised for deriving the control signal, with particular advantage in an LC oscillator in which the sensing coil is a component determining the frequency and occurrence of the oscillations of the oscillator and the control signals are derived from the application or interruption of the oscillation. This can avoid additional losses caused by constant oscillation of the oscillator. The sensing coil is comparatively insensitive to temperature variations. Special coupling or screening means and control coils are unnecessary even in the case of several stator windings of which the control circuits are successively controlled by impulses derived from the parameter change of the sensing coil by an appropriately constructed control circuit. In order to connect the sensing coil to the control circuit, only one terminal for the sensing coil need be led out of the motor. The other terminal can be internally connected to the motor terminal provided for the D.C. source.

Preferably, the core of the sensing coil consists at least partially of ferrite. Ferrite can be saturated by means of a comparatively small flux so that one obtains a sudden change in the parameter of the sensing coil with a change in its flux. Consequently this change can be brought about even by a weak field of the rotor magnet.

It is also favourable if the core of the sensing coil is premagnetised. In this way one can make do with a still smaller additional flux in order to saturate the core. Further, this ensures that the core is always saturated by an additional flux of only the one polarity but not the other so that there will be a clear indication of the rotary angle.

For the purpose of premagnetisation, the core of the sensing coil may comprise a permanent magnet. This saves energy for maintaining a premagnetising current.

Preferably, provision is made for the stator to have, apart from a first winding, only a second winding which is in series with a second servo-element at the D.C. source, and for the second servo-element to be likewise controllable by control signals derived from the parameter changes of the sensing coil. This number of stator windings represents a particularly favourable compromise with regard to efficiency and expense. As far as the motor is concerned, it is sufficient to have a single additional winding ensuring a more uniform torque and thus a higher efficiency and a single additional motor terminal for controlling the second winding if a junction of the stator windings connected to the D.C. source is connected to a terminal of the sensing coil. As far as the control circuit is concerned, in the simplest case it is sufficient to have a reversing stage and the second servo-element in addition in order to control the second stator winding in countersequence to the first. The motor delivers a high starting torque at a low starting current. The servo-elements can be designed for a correspondingly low starting current and the rotor magnet can be thinner without resulting in demagnetisation. This likewise contributes to an increase in the efficiency. The same applies to a preferably laminated construction of the stator and/or rotor, which contributes to a reduction in eddy current losses. The D.C. motor is particularly suitable for driving the piston compressor of a refrigerator because its pulsating torque accurately corresponds to the torque requirement of the compressor.

The servo-elements are preferably power transistors operated as switches. In contrast with, for example, thyristors which, in principle, could likewise be used, the control energy for transistors is less because the quenching means are dispensed with. A transistor operated as a switch can transmit higher outputs in relation to its energy loss. The power transistors can therefore have correspondingly small dimensions.

It is also favourable if a diode is connected anti-parallel to each power transistor. In this way it is possible to increase the efficiency by returning to the D.C. source through one of the stator windings and the associated diode that energy stored in the other stator winding after blocking of the associated power transistor.

Further, it is advantageous if the wires of the stator windings are wound in close juxtaposition and are identical. This gives a higher coupling factor between the windings and thus a better return flow to the D.C. source through one of the windings of the energy stored in the other winding that is switched off and this again contributes to an increase in the efficiency.

Preferably, provision is made for the static magnetic field distribution between the rotor and stator to be so selected in the peripheral direction that the pole axis of the stationary rotor includes an acute angle with the pole axis of the stator, and for the stationary position of the rotor in relation to that of an operating element which is driven by the motor and executes alternate operating and idling strokes to be so selected that the motor starts at no load, e.g. giving a suction stroke of the compressor of a refrigerator. This will result in a particularly low starting current.

To achieve the magnetic field distribution ensuring self-starting, the air gap between the stator and rotor can differ in the peripheral direction and/or there may be provided a permanent magnet near the rotor periphery and/or an unsymmetrical permanent magnet pole distribution in the rotor.

The drawings diagrammatically illustrate preferred examples. In the drawings.

Figure 1:
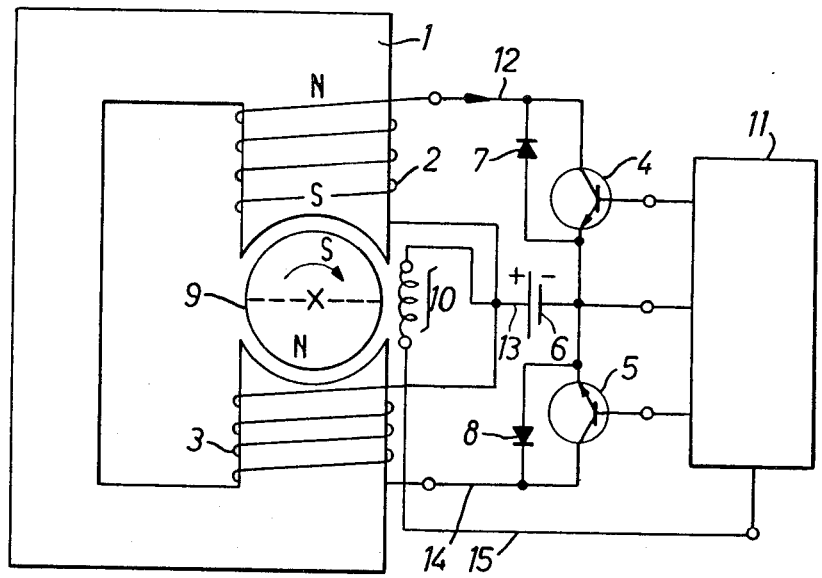
FIG. 1 illustrates a brushless D.C. motor and the associated control circuit.

In the preferred embodiment of the brushless D.C. motor according to FIG. 1, the stator 1 is provided with two windings 2 and 3. Each winding 2, 3 is in series at a D.C. source 6 with a controllable electric servo-element 4, 5 in the form of a power transistor operated as a switch. A diode 7, 8 is in anti-parallel with each servo element 4, 5. The rotary position of the rotor 9 in the form of a permanent magnet is determined by means of a sensing coil 10 which is disposed in the vicinity of the rotor 9 and has a premagnetised saturable core. The sensing coil 10 is on the one hand connected to the same pole of the D.C. source 6 with which the windings 2 and 3 are directly connected and on the other hand it is connected to a control unit 11 so that only four leads 12, 13, 14 and 15 will suffice for the motor.

Provision is made as hereinafter described for the rotor 9 to assume the illustrated rest position when the windings 2, 3 are de-energised; in this rest position the pole axis of the rotor includes an acute angle with the pole axis of the stator 1. The field of the rotor 9 in this position of the rotor 9 results in such an inductance in the core of the sensing coil 10 that the control unit supplies the servo-element 4 with a control signal. The servo-element 4 is thereupon controlled through and a current flows in the line 12 in the direction of the arrow. The south pole S thus formed for the winding 2 repels the south pole S of the rotor 9 so that the rotor 9 starts to turn in the direction indicated by the curved portion. After half a revolution of the rotor 9, the inductance in the core of the sensing coil 10 has changed in so far that the control signal disappears at the control input of the servo-element 4 and is instead applied to the control input of the servo-element 5. As a result, the current through the servo-element 4 is interrupted, the coil 2 is de-energised and a current flows through the coil 3. The lower pole shoe of the stator therefore becomes so magnetised that its south pole faces the south pole S of the rotor and imparts to the rotor 9 a further impulse in the same rotary sense. Each time a servo-element 4 or 5 becomes blocked, the series winding 2 or 3 can discharge in the manner of a transformer into the D.C. source 6 by way of the other winding 3 or 2 and the appropriate diode 8 or 7. In this way one obtains a higher efficiency.

During each rotation of the rotor 9, these steps are repeated.

Figure 2:
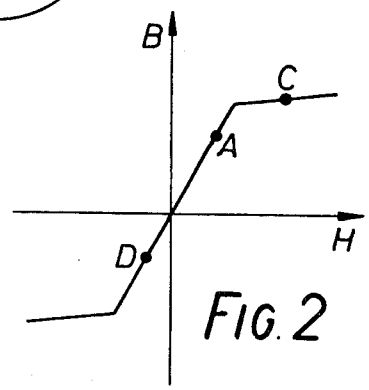
FIG. 2 shows the B-H characteristic of the sensing coil.

According to FIG. 2, the core of the sensing coil 10 is premagnetised up to the point A on the B-H curve and the core material is selected so that the B-H curve is practically rectangular. A comparatively small additional flux therefore suffices to saturate the core to a point where the inductance of the coil is practially zero. This sudden change in inductance in the one or other direction is utilised in the control unit 11 for deriving the control signal for the servo-elements 4 and 5. The premagnetisation ensures that the core is saturated positively only once during each rotor revolution up to the point C and becomes unsaturated only once up to the point D. A high inductance of the sensing coil 10 results in a control of one of the control elements with simultaneous blocking of the other and a low inductance of the sensing coil 10 results in a control of the other control element with simultaneous blocking of the one control element.

Figure 3:
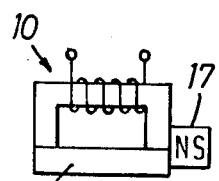
FIGS. 3 and 4 show different embodiments of the core of the sensing coil.
Figure 4:
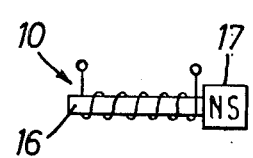

In accordance with FIGS. 3 and 4, the core of the sensing coil 10 can have one part 16 consisting of ferrite and a permanent magnet 17 for premagnetisation. The sensing coil 10 is only diagrammatically illustrated in FIG. 1. In practice, it is disposed relatively to the rotor 9 so that it is magnetised up to the point C or D in the position of the rotor where the pole axes of the rotor and stator come together. The axis of the sensing coil 10 may be directed toward the rotor, e.g. radially or towards its end.

Figure 6:
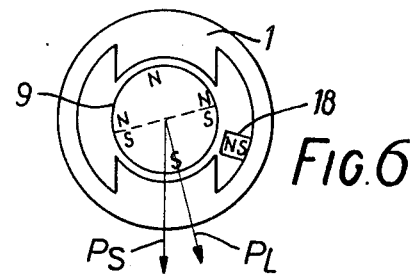
FIGS. 6 and 7 illustrate different embodiments of the stator and rotor for achieving a stable holding point of the rotor when the stator winding is switched off.
Figure 5:
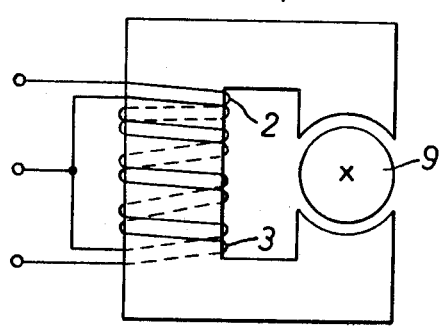
FIG. 5 illustrates an embodiment of the motor with bifilar-wound stator windings.

According to FIG. 5, the stator windings 2, 3 can be bifilar, i.e. wound in close juxtaposition and identical. This results in a closer magnetic coupling between the windings 2, 3 and thus a better return flow of the magnetic energy stored in the windings after they are switched off, which, in turn, increases the motor efficiency. To attain a stable holding point when the windings 2, 3 are de-energized, i.e. when the motor is switched off, the stator according to FIG. 6 may comprise a permanent magnet 18 arranged so that the pole axis $P_S$ of the stator 1 includes an acute angle with the pole axis $P_L$ of the rotor, which could also comprise several permanent magnets. In this way it is ensured that the winding which is first energised when switching the motor on immediately exerts a torque on the rotor 9 whereby the motor is self-starting.

Figure 7:
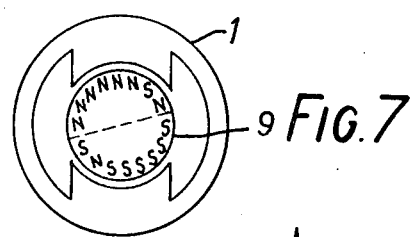

The same effect can be achieved in accordance with FIG. 7 by a corresponding unsymmetrical distribution of the north and south poles of the rotor 9. Another possibility for a corresponding unsymmetrical distribution of the induction in the air gap of the motor consists of allowing the air gap to converge or diverge in the peripheral direction. These features may also be combined.

We claim:

1. A brushless self-starting D.C. motor assembly comprising, a rotor having a permanent magnet providing a premagnetized rotor field, a stator and stator windings, a D.C. source, electrically controllable switch means between said source and said winding, position sensing coil means adjacent said rotor and having a core which is at least partially ferrite and which is saturatable by said rotor field at a predetermined position of said rotor to provide a control signal, switch control means between said coil means and said switch means for receiving said signal and actuating said switch means, and auxilliary magnetic means for establishing a static magnetic field distribution in which said stator is displaced an acute angle from a dead center position relative to said stator.

2. A brushless motor assembly according to claim 1 wherein said coil comprises a permanent magnet.

3. A brushless motor assembly according to claim 1 wherein said switch means are power transistors.

4. A brushless motor assembly according to claim 3 including diodes connected in respective anti-parallel relation to said transistors.

5. A brushless motor assembly according to claim 1 wherein the air gap between said stator and said rotor differs in the peripheral direction, said magnetic means including a permanent magnet near the motor periphery.

6. A brushless motor assembly according to claim 1 wherein said magnetic means includes an unsymmetrical permanent magnet pole distribution in said rotor in order to achieve the magnetic field distribution to insure self-starting.

* * * * *